(12) United States Patent
Fukasawa et al.

(10) Patent No.: US 9,683,651 B2
(45) Date of Patent: Jun. 20, 2017

(54) LUBRICATION SYSTEM FOR TRANSMISSION

(71) Applicant: HONDA MOTOR CO., LTD., Tokyo (JP)

(72) Inventors: Shin Fukasawa, Wako (JP); Mitsuo Kimura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 179 days.

(21) Appl. No.: 14/730,237

(22) Filed: Jun. 4, 2015

(65) Prior Publication Data

US 2015/0362060 A1 Dec. 17, 2015

(30) Foreign Application Priority Data

Jun. 11, 2014 (JP) ................. 2014-120929

(51) Int. Cl.
| | | |
|---|---|---|
| *F16H 57/04* | (2010.01) | |
| *F16H 57/031* | (2012.01) | |
| *F16H 57/02* | (2012.01) | |
| *F16H 3/00* | (2006.01) | |
| *F16H 3/093* | (2006.01) | |

(52) U.S. Cl.
CPC ......... *F16H 57/043* (2013.01); *F16H 57/031* (2013.01); *F16H 57/0424* (2013.01); *F16H 57/0431* (2013.01); *F16H 57/0457* (2013.01); *F16H 57/0471* (2013.01); *F16H 57/0494* (2013.01); *F16H 3/006* (2013.01); *F16H 3/093* (2013.01); *F16H 2057/02047* (2013.01); *F16H 2200/0065* (2013.01)

(58) Field of Classification Search
CPC .. F16H 57/043; F16H 57/031; F16H 57/0471; F16H 57/0494; F16H 57/0457; F16H 57/0431; F16H 3/006; F16H 3/093; F16H 2057/02047; F16H 2200/0065
See application file for complete search history.

(56) References Cited

FOREIGN PATENT DOCUMENTS

| | | |
|---|---|---|
| JP | 5-83478 U | 11/1993 |
| JP | 2002-310271 | 10/2002 |
| JP | 2009-138769 | 6/2009 |
| JP | 2011-250524 | 12/2011 |
| JP | 2012-197898 | 10/2012 |

OTHER PUBLICATIONS

Japanese Office Action for corresponding JP Application No. 2014-120929, Dec. 27, 2016 (w/ English machine translation).

*Primary Examiner* — William E Dondero
*Assistant Examiner* — Mark K Buse
(74) *Attorney, Agent, or Firm* — Mori & Ward, LLP

(57) ABSTRACT

A lubrication system for a transmission includes a first tubular portion, a second tubular portion, and a hollow cylindrical member. The first tubular portion has a cavity and includes a flange at one end adjacent to a gear shaft of the transmission. The first tubular portion has a first enlarged-diameter part extending in an axial direction from a joint at which the first tubular portion is joined to the second tubular portion. The second tubular portion has a second enlarged-diameter part that extends in the axial direction from the joint and has a diameter substantially equal to a diameter of the first enlarged-diameter part. The hollow cylindrical member is disposed in the first and second tubular portions and tightly fitted in the first and second enlarged-diameter parts of the first and second tubular portions joined to each other.

10 Claims, 5 Drawing Sheets

BACKGROUND ART

LUBRICATION SYSTEM FOR TRANSMISSION

CROSS-REFERENCE TO RELATED APPLICATIONS

The present application claims priority under 35 U.S.C. §119 to Japanese Patent Application No. 2014-120929, filed Jun. 11, 2014, entitled "Lubrication System for Transmission." The contents of this application are incorporated herein by reference in their entirety.

BACKGROUND

1. Field

The present disclosure relates to a lubrication system for a transmission.

2. Description of the Related Art

A manual transmission lubrication system known in the art is configured in such a manner that rotation of a gear shaft causes toothed rotatable members, such as gears, arranged on the shaft to splash lubricating oil stored in a bottom portion of a housing, drops of the splashed lubricating oil collide with one another and scatter in all directions, the gear shaft or a bearing for the shaft is sprayed with the drops of the lubricating oil, and rotational sliding portions of members are lubricated with the sprayed lubricating oil. Another transmission lubrication system known in the art is configured as follows (refer to Japanese Unexamined Patent Application Publication No. 2002-310271, for example). A gear shaft has therein a lubricating oil supply hole extending axially and having one open end. A plurality of supply ports arranged in a circumferential surface of the gear shaft communicate with the lubricating oil supply hole. A hollow plug member (or pipe member) is disposed between the lubricating oil supply hole and a transmission case such that the plug member enters the lubricating oil supply hole. Part of lubricating oil splashed by gears passes through a lubricating oil passage in the transmission case and is supplied through the pipe member into the lubricating oil supply hole in the gear shaft. The supplied lubricating oil passes through the supply ports due to centrifugal force caused by rotation of the gear shaft, so that the lubricating oil is supplied to the gear shaft and toothed rotatable members or rotational sliding portions of a bearing.

SUMMARY

According to one aspect of the present invention, a lubrication system for a transmission includes a first tubular portion, a second tubular portion, and a hollow cylindrical member. The transmission includes a gear shaft having therein a lubricating oil supply passage that extends axially and has at least one open end, a housing rotatably supporting the gear shaft, and a cover fastened to the housing by a fastener. The cover has therein a lubricating oil passage. The first tubular portion faces an opening of the gear shaft, protrudes from an outer surface of the housing, and has a cavity. The second tubular portion is joined to the first tubular portion. The second tubular portion protrudes from an inner surface of the cover and has a cavity. The hollow cylindrical member is disposed in the first and second tubular portions. The first tubular portion has a first enlarged-diameter part axially extending from a joint at which the first tubular portion is joined to the second tubular portion. The second tubular portion has a second enlarged-diameter part that axially extends from the joint and has a diameter identical to that of the first enlarged-diameter part. The first tubular portion includes a flange at one end adjacent to the gear shaft. The hollow cylindrical member is tightly fitted in the first and second enlarged-diameter parts of the first and second tubular portions joined to each other. The flange and the opening of the gear shaft define spacing therebetween.

According to another aspect of the present invention, a lubrication system for a transmission includes a first tubular portion, a second tubular portion, and a hollow cylindrical member. The first tubular portion has a cavity and includes a flange at one end adjacent to a gear shaft of the transmission. The gear shaft has an opening and extends in an axial direction of the gear shaft. The first tubular portion faces the opening of the gear shaft and protrudes in the axial direction from an outer surface of a housing of the transmission. The housing rotatably supports the gear shaft. The flange and the opening define a space between the flange and the opening. The second tubular portion has a cavity, is joined to the first tubular portion, and protrudes in the axial direction from an inner surface of a cover of the transmission. The cover is fastened to the housing with a fastener. The first tubular portion has a first enlarged-diameter part extending in the axial direction from a joint at which the first tubular portion is joined to the second tubular portion. The second tubular portion has a second enlarged-diameter part that extends in the axial direction from the joint and has a diameter substantially equal to a diameter of the first enlarged-diameter part. The hollow cylindrical member is disposed in the first and second tubular portions and tightly fitted in the first and second enlarged-diameter parts of the first and second tubular portions joined to each other.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
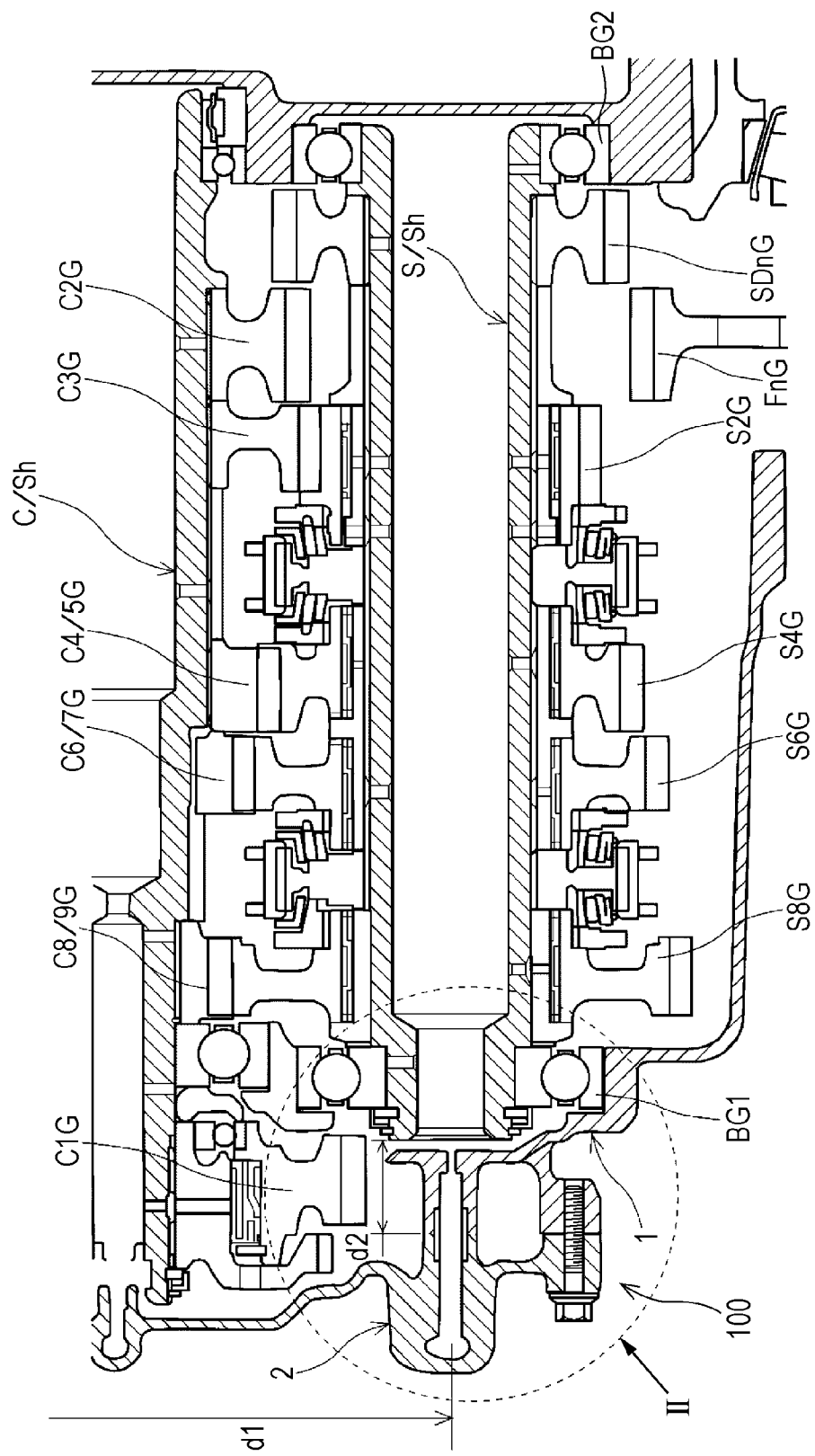
FIG. 1 is a longitudinal sectional view of part of a transmission in an embodiment and illustrates gear shafts and bearings of the transmission.

The embodiments will now be described with reference to the accompanying drawings, wherein like reference numerals designate corresponding or identical elements throughout the various drawings.

An embodiment will be described below with reference to the drawings.

Figure 2:
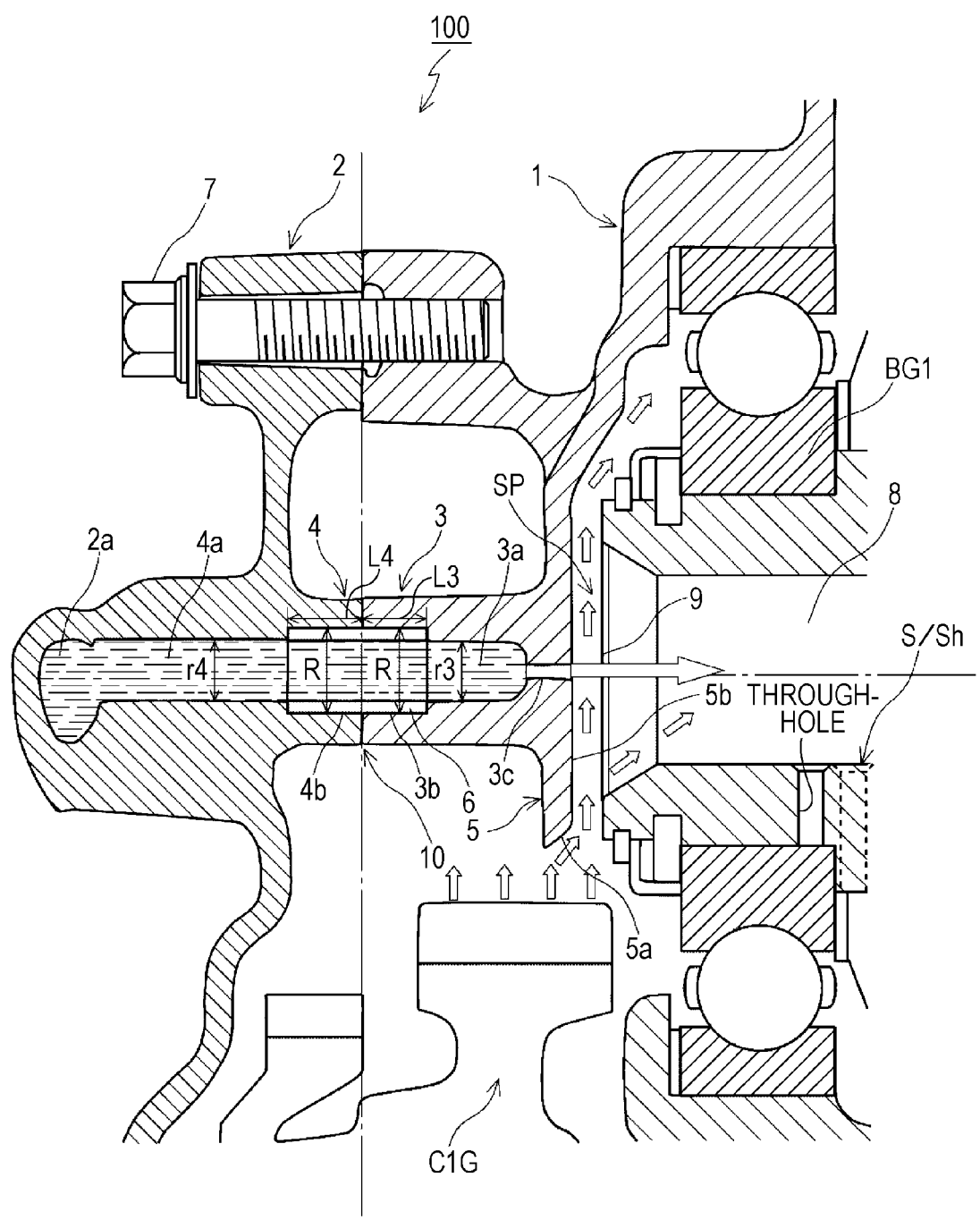
FIG. 2 is an enlarged view of a lubrication system according to the embodiment for the transmission illustrated in FIG. 1.
Figure 3:
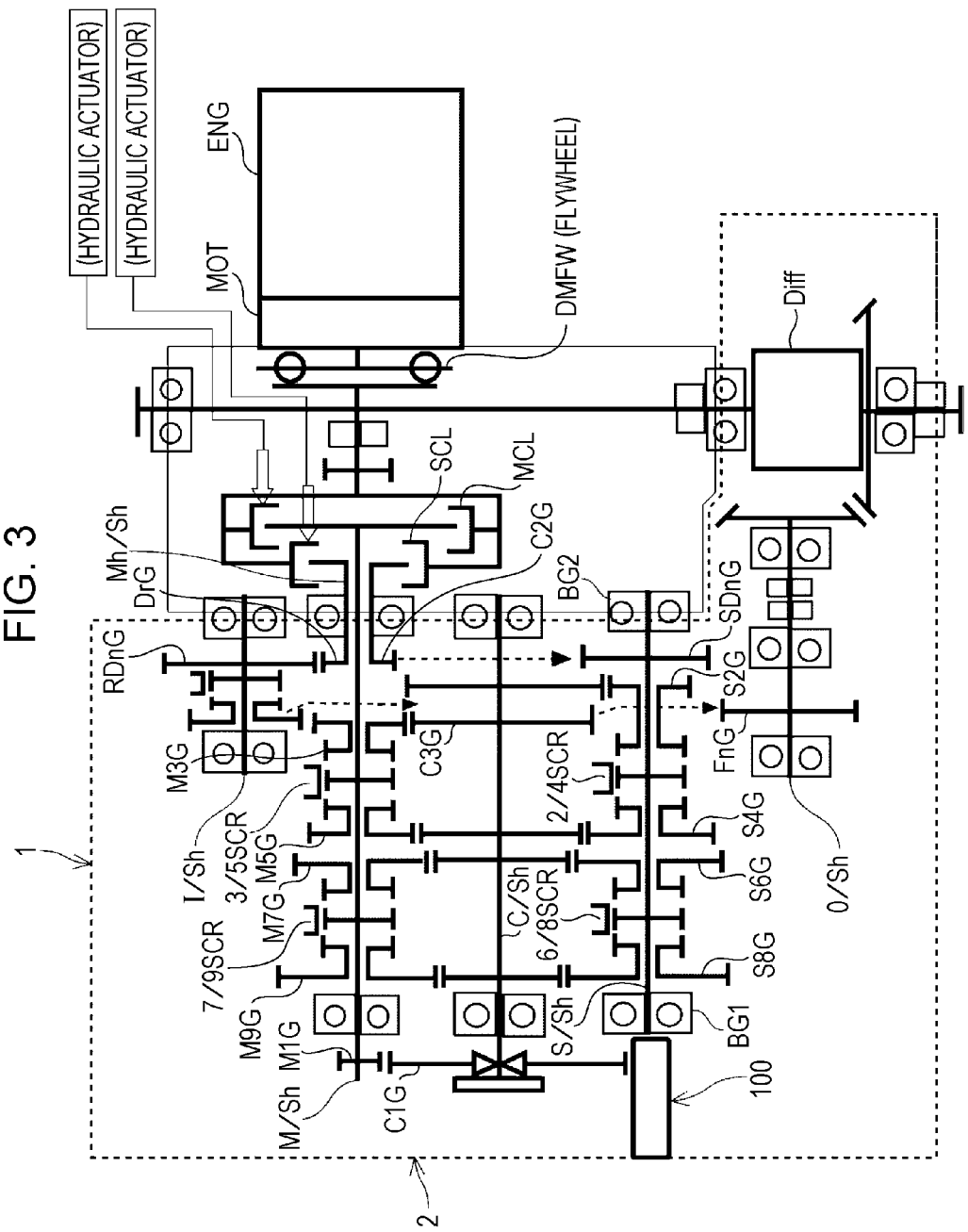
FIG. 3 is a system configuration diagram of the transmission in the embodiment.

FIGS. 1 to 3 illustrate a transmission lubrication system 100 according to this embodiment. FIG. 1 is a longitudinal sectional view illustrating gear shafts and bearings of a transmission in the embodiment. FIG. 2 is an enlarged view of the transmission lubrication system 100 according to the embodiment for the transmission of FIG. 1. FIG. 3 is a system configuration diagram of the transmission in the embodiment. For convenience of illustration, a counter shaft C/Sh is located above a secondary shaft S/Sh in FIGS. 1 and 3. Note that the secondary shaft S/Sh is actually located above the counter shaft C/Sh.

As illustrated in FIG. 1, a target portion of the transmission to be lubricated by the transmission lubrication system 100 includes the secondary shaft S/Sh and bearings BG1 and BG2 for the secondary shaft S/Sh. For example, as illustrated in FIG. 1, the secondary shaft S/Sh is remote from the level of lubricating oil stored in a bottom portion of a housing 1 at a long distance d1. In addition, an opening at one end of the secondary shaft S/Sh is remote from a cover 2 at a long distance d2. The transmission in the embodiment is, for example, a nine-speed transmission having nine forward gear ratios and a single reverse gear ratio as illustrated in FIG. 3. This transmission will now be described in brief with reference to FIG. 3. The transmission includes five major gear shafts, i.e., a main shaft M/Sh, the counter shaft C/Sh, the secondary shaft S/Sh, an output shaft O/Sh, and an idle shaft I/Sh. As regards the main shaft M/Sh and the secondary shaft S/Sh, odd-numbered speed gears, namely, a main first-speed gear M1G, a main third-speed gear M3G, a main fifth-speed gear M5G, a main seventh-speed gear M7G, and a main ninth-speed gear M9G are arranged on the main shaft M/Sh such that the gears except the main first-speed gear M1G are rotatable relative to one another. On the other hand, even-numbered speed gears, namely, a secondary second-speed gear S2G, a secondary fourth-speed gear S4G, a secondary sixth-speed gear S6G, and a secondary eighth-speed gear S8G, and a secondary driven gear SDnG are arranged on the secondary shaft S/Sh such that the gears except the secondary driven gear SDnG are rotatable relative to one another. In addition, the main shaft M/Sh is provided with a third-fifth speed synchromesh mechanism 3/5SCR and a seventh-ninth speed synchromesh mechanism 7/9SCR and the secondary shaft S/Sh is provided with a second-fourth speed synchromesh mechanism 2/4SCR and a sixth-eighth speed synchromesh mechanism 6/8SCR. The third-fifth speed synchromesh mechanism 3/5SCR selectively connects either the main third-speed gear M3G or the main fifth-speed gear M5G to the main shaft M/Sh to rotate the gear synchronously with the shaft. The seventh-ninth speed synchromesh mechanism 7/9SCR selectively connects either the main seventh-speed gear M7G or the main ninth-speed gear M9G to the main shaft M/Sh to rotate the gear synchronously with the shaft. The second-fourth speed synchromesh mechanism 2/4SCR selectively connects either the secondary second-speed gear S2G or the secondary fourth-speed gear S4G to the secondary shaft S/Sh to rotate the gear synchronously with the shaft. The sixth-eighth speed synchromesh mechanism 6/8SCR selectively connects either the secondary sixth-speed gear S6G or the secondary eighth-speed gear S8G to the secondary shaft S/Sh to rotate the gear synchronously with the shaft. Rotational power from a drive power source (including an engine ENG and a motor MOT) is transmitted to the main shaft M/Sh via a main clutch MCL and is also transmitted to the secondary shaft S/Sh via a secondary clutch SCL.

Examples of torque transmission in the above-described transmission will now be described. To provide first speed in the transmission, the main clutch MCL is engaged to directly connect the drive power source (the engine ENG and the motor MOT) to the main shaft M/Sh, thus sequentially transmitting torque (rotational driving force) to the main first-speed gear M1G, a counter first-speed gear C1G, a counter third-speed gear C3G, a final driven gear FnG, and a differential gear Diff in that order. To provide second speed in the transmission, the secondary clutch SCL is engaged to directly connect the drive power source (the engine ENG and the motor MOT) to a main hollow shaft Mh/Sh disposed on and rotatable relative to the main shaft M/Sh, thus sequentially transmitting torque (rotational driving force) to a drive gear DrG, a reverse driven gear RDrG, the secondary driven gear SDnG, the second-fourth speed synchromesh mechanism 2/4SCR, the secondary second-speed gear S2G, a counter second-speed gear C2G, the counter third-speed gear C3G, the final driven gear FnG, and the differential gear Diff in that order. Third-speed and other speeds are similarly provided.

To lubricate the inside of the gear shaft (S/Sh) and the bearings (BG1 and BG2) in the above-described nine-speed transmission, the transmission lubrication system 100 according to the embodiment includes a first tubular portion 3 that protrudes from an outer surface of the housing 1 accommodating the shafts, such as the secondary shaft S/Sh, and that has a manifold 3a through which lubricating oil flows, a second tubular portion 4 that protrudes from an inner surface of the cover 2 having a lubricating oil passage 2a therein and that is aligned with and joined to the first tubular portion 3 and has a manifold 4a through which the lubricating oil flows, a flange 5 disposed at one end of the first tubular portion 3 adjacent to the secondary shaft S/Sh, and a dowel member (hollow cylindrical member) 6 tightly fitted in enlarged-diameter parts 3b and 4b, which will be described later, to provide a desired pressure of the lubricating oil. The components will now be described.

The housing 1 stores a constant amount of lubricating oil and accommodates the secondary shaft S/Sh and the other gear shafts, i.e., the main shaft M/Sh, the counter shaft C/Sh, the output shaft O/Sh, and the idle shaft I/Sh. In the embodiment, a positioning dowel hole defined by raised part of the outer surface of the housing 1 is aligned with the secondary shaft S/Sh and is used as an introduction pipe for introducing the lubricating oil into the secondary shaft S/Sh. The dowel hole of the housing 1 includes the manifold 3a, the enlarged-diameter part 3b, and an orifice passage 3c which will be described later, and is configured so that the lubricating oil can reach a lubricating oil supply passage 8 of the secondary shaft S/Sh in a low speed mode.

The cover 2 defines a tightly sealed space in the housing 1 and has the lubricating oil passage 2a for introducing the lubricating oil splashed by toothed rotatable members, such as gears, into the shaft, such as the secondary shaft S/Sh, (or the lubricating oil supply passage 8). In the embodiment, a positioning dowel hole defined by raised part of the inner surface of the cover 2 is used as an introduction pipe for introducing the lubricating oil into the secondary shaft S/Sh in addition to the positioning dowel hole of the housing 1. The dowel hole of the cover 2 is accordingly aligned with the dowel hole of the housing 1 and includes the manifold 4a and the enlarged-diameter part 4b. The cover 2 is fastened to the housing 1 by bolts 7.

Figure 4:
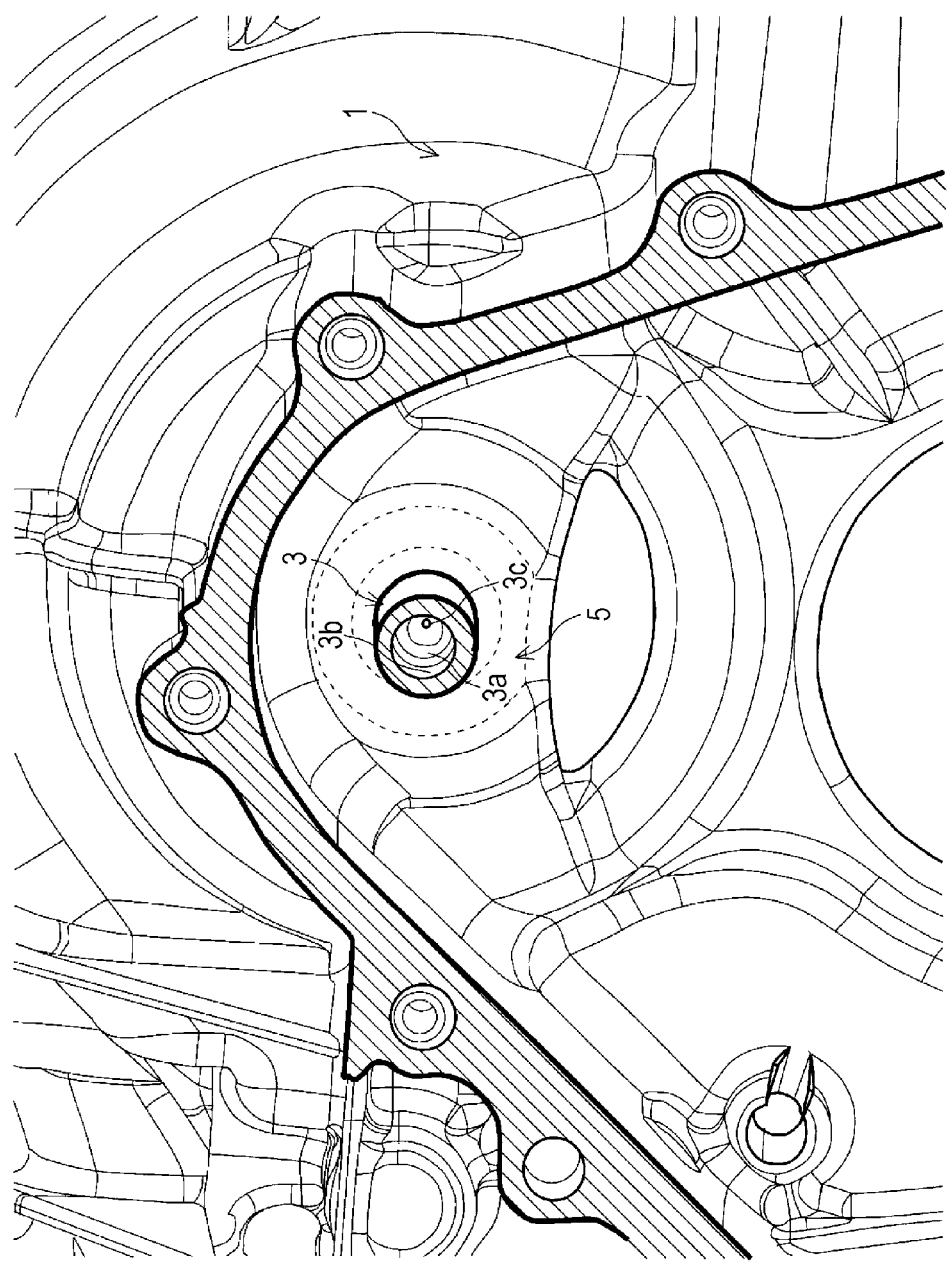
FIG. 4 is a diagram explaining a first tubular portion in the embodiment.

Referring to FIG. 4, the first tubular portion 3 protruding from the outer surface of the housing 1 serves as the positioning dowel hole. Specifically, in the embodiment, a cavity, serving as the dowel hole, is used as the manifold 3a through which the lubricating oil is supplied to the lubricating oil supply passage 8 of the secondary shaft S/Sh. In addition, the orifice passage 3c, which is narrow, is disposed downstream of the manifold 3a so that the lubricating oil ejected from an end surface of the first tubular portion 3 can reach the lubricating oil supply passage 8 of the secondary shaft S/Sh in the low speed mode. When the lubricating oil passes through the orifice passage 3c, the lubricating oil is squeezed, resulting in an increase in velocity head. Thus, the lubricating oil is forcefully ejected from a downstream end of the manifold 3a such that the lubricating oil appropriately reaches the lubricating oil supply passage 8 of the secondary shaft S/Sh.

The first tubular portion 3 has the enlarged-diameter part (hereinafter, "first enlarged-diameter part") 3b axially extending in a predetermined range L3 from a joint 10 at which the first tubular portion 3 is joined to the second tubular portion 4. The first enlarged-diameter part 3b has an inside diameter R larger than another inside diameter r3 of the first tubular portion 3. The dowel member 6, which is a hollow cylinder, is fitted in the first enlarged-diameter part 3b and the enlarged-diameter part 4b (hereinafter, referred to as the "second enlarged-diameter part 4b"), which will be described later, of the second tubular portion 4. The dowel member 6 appropriately prevents the lubricating oil from leaking from the joint 10 of the first and second tubular portions 3 and 4 to cause a reduction in oil pressure. In other words, the dowel member 6 functions as a seal for preventing the leakage of the lubricating oil from the joint 10.

Again referring to FIG. 2, the second tubular portion 4 protruding from the inner surface of the cover 2 is aligned with the first tubular portion 3. Like the first tubular portion 3, the second tubular portion 4 serves as the positioning dowel hole and has the second enlarged-diameter part 4b for receiving the dowel member 6. The second enlarged-diameter part 4b axially extends in a predetermined range L4 from the joint 10 at which the second tubular portion 4 is joined to the first tubular portion 3. The second enlarged-diameter part 4b has an inside diameter R larger than another inside diameter r4 of the second tubular portion 4.

The flange 5 is disposed at the end of the first tubular portion 3 facing an opening 9 of the secondary shaft S/Sh. The flange 5 is disposed adjacent to an outer circumferential surface of the gear (e.g., the counter first-speed gear C1G) closest to the flange 5. The flange 5 has an inclined side surface (tapered face) 5a. The flange 5 and the opening 9 of the secondary shaft S/Sh define spacing SP (space SP) therebetween. Consequently, part of the lubricating oil splashed and scattered by, for example, the counter first-speed gear C1G, is collected by the side surface 5a. The collected lubricating oil is guided by a bottom surface 5b of the flange 5 through the spacing SP to the lubricating oil supply passage 8 and the bearing BG1. As regards lubrication of the bearing BG1, it is difficult to form a through-hole in the vicinity of a stepped portion of the shaft and it would be accordingly difficult to supply the lubricating oil from the inside of the shaft via a through-hole to a side surface of the bearing BG1 in a lubrication system known in the art. According to the embodiment, the side surface 5a of the flange 5 and the spacing SP allow supply of the lubricating oil to the side surface of the bearing BG1.

Specifically, in the transmission lubrication system 100 according to the embodiment, the lubricating oil flowing through the lubricating oil passage 2a in the cover 2 is supplied through the above-described first and second tubular portions 3 and 4 to the lubricating oil supply passage 8 of the secondary shaft S/Sh. Part of the lubricating oil splashed and scattered by the gear closest to the flange 5, for example, the counter first-speed gear C1G, is appropriately collected by the side surface 5a of the flange 5 at the end of the first tubular portion 3 and is then supplied along the bottom surface 5b of the flange 5 through the spacing SP to the side surface of the bearing BG1.

As described above, the transmission lubrication system 100 according to the embodiment requires no additional pipe member for introducing the lubricating oil into the gear shaft whose opening at its end is remote from a lubricating oil ejection port and accordingly requires no attachment of such a pipe member to a transmission case, and enables appropriate lubrication of the inside of the gear shaft and the bearing during transition from the low speed mode to a high speed mode. Specifically, the dowel holes of the housing 1 and the cover 2 are aligned with the secondary shaft S/Sh. The cavities, serving as the dowel holes, are used as the manifolds 3a and 4a for the lubricating oil. The first and second tubular portions 3 and 4 have the first and second enlarged-diameter parts 3b and 4b, respectively, such that the enlarged-diameter parts 3b and 4b extend in the predetermined ranges L3 and L4, respectively, in opposite directions from the joint 10 of the portions 3 and 4. The dowel member 6 is tightly fitted in the first and second enlarged-diameter parts 3b and 4b. When the lubricating oil passes through the first and second tubular portions 3 and 4, the dynamic pressure of the lubricating oil is increased and the lubricating oil is forcefully discharged (ejected) from the end of the first tubular portion 3, so that the lubricating oil is supplied to the lubricating oil supply passage 8 of the secondary shaft S/Sh. In particular, an orifice structure (the orifice passage 3c), serving as a lubricating oil ejection port, in the end of the first tubular portion 3 allows the dynamic pressure of the lubricating oil to be further increased and also allows the lubricating oil to be more forcefully discharged (ejected). Consequently, more lubricating oil can be supplied to the lubricating oil supply passage 8 of the secondary shaft S/Sh.

In addition, since the first tubular portion 3 includes the flange 5 having the inclined side surface 5a such that the flange 5 is disposed at the end of the first tubular portion 3 adjacent to the secondary shaft S/Sh, part of the lubricating oil splashed and scattered by the gear closest to the flange 5, for example, the counter first-speed gear C1G, is appropriately collected by the side surface 5a of the flange 5 at the end of the first tubular portion 3 and the collected lubricating oil is supplied along the bottom surface 5b of the flange 5 to the side surface of the bearing BG1 through the spacing SP.

The transmission lubrication system 100 according to the embodiment requires no additional pipe member, which has been required in a lubrication system known in the art, no additional members for attaching such a pipe member to the housing 1, and no additional processing of attachment, thus resulting in a reduction in cost of parts and processing.

Since the first tubular portion 3 (housing 1) is securely coupled to the second tubular portion 4 (cover 2) by the dowel member 6, part of the housing 1 in the vicinity of the secondary shaft S/Sh is accordingly supported by the cover 2, thus appropriately increasing the rigidity of the housing 1. Additionally, since the dowel member 6 is tightly fitted in the first and second enlarged-diameter parts 3b and 4b, the dowel member 6 also functions as a seal for preventing the leakage of the lubricating oil.

Although the nine-speed transmission has been described as an example in the above-described embodiment, the embodiment is not limited to this example. The present disclosure may be applied to any transmission that includes a gear shaft whose opening at its end is remote from a lubricating oil ejection port and a bearing for the gear shaft.

Figure 5A:
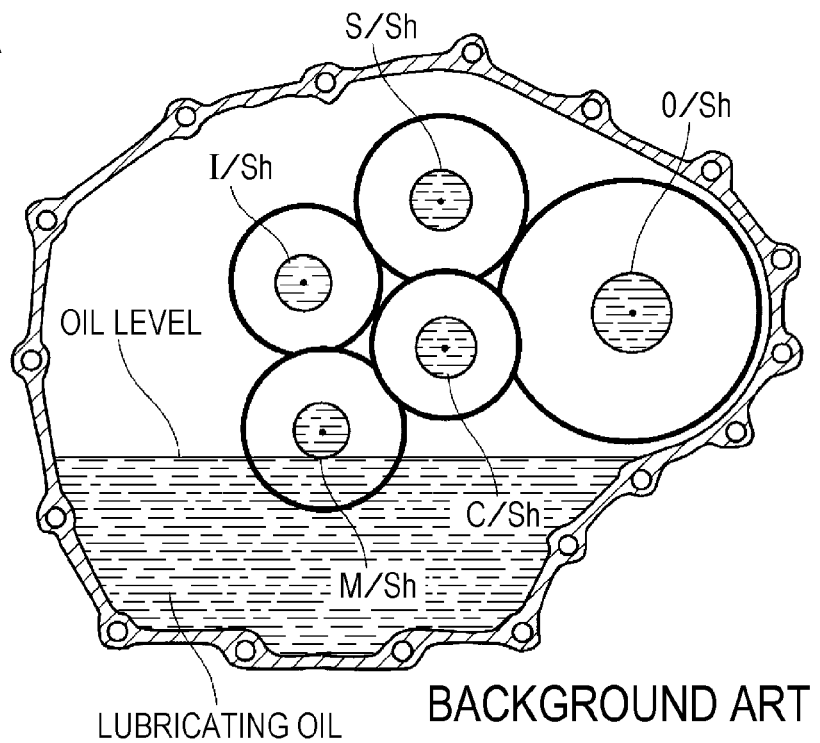
FIGS. 5A and 5B are diagrams explaining a transmission lubrication system known in the art.
Figure 5B:
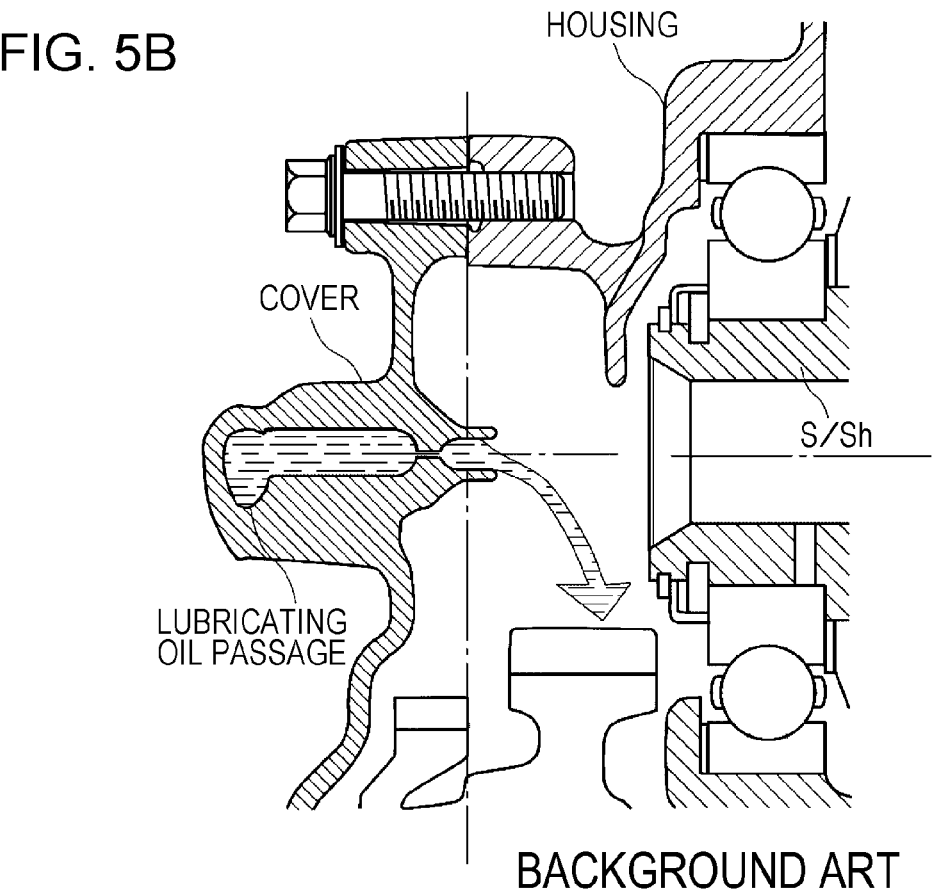

The applicant of the present application has developed a nine-speed transmission having nine forward gear ratios and a single reverse gear ratio. FIG. 5A illustrates the transmission which includes five major gear shafts, i.e., a main shaft M/Sh, a secondary shaft S/Sh, a counter shaft C/Sh, an output shaft O/Sh, and an idle shaft I/Sh. The secondary shaft S/Sh is disposed farthest from the level of oil. Unfortunately, splashed lubricating oil hardly reaches into the secondary shaft S/Sh or rotational sliding portions of a bearing for the secondary shaft S/Sh. In particular, if an intra-shaft lubricating oil ejection port is far away from one end of the secondary shaft S/Sh as illustrated in FIG. 5B, the oil could not be distributed into the shaft in a low speed mode in which a desired oil pressure could not be provided.

An aspect of the present application provides a lubrication system for a transmission including a gear shaft having therein a lubricating oil supply passage which extends axially and has at least one open end, a housing rotatably supporting the gear shaft, and a cover fastened to the housing by a fastener. The cover has therein a lubricating oil passage. The lubrication system includes a first tubular portion, a second tubular portion, and a hollow cylindrical member disposed in the first and second tubular portions. The first tubular portion faces an opening of the gear shaft, protrudes from an outer surface of the housing, and has a cavity. The second tubular portion is joined to the first tubular portion and protrudes from an inner surface of the cover and has a cavity. The first tubular portion has a first enlarged-diameter part axially extending from a joint at which the first tubular portion is joined to the second tubular portion. The second tubular portion has a second enlarged-diameter part axially extending from the joint and having a diameter identical to that of the first enlarged-diameter part. The first tubular portion includes a flange at one end adjacent to the gear shaft. The hollow cylindrical member is tightly fitted in the first and second enlarged-diameter parts of the first and second tubular portions joined to each other. The flange and the opening of the gear shaft define spacing therebetween.

In such a configuration, dowel holes (the first and second tubular portions) arranged in the outer surface of the housing and the inner surface of the cover and a dowel member (the hollow cylindrical member) are used to introduce lubricating oil supplied from the cover into the gear shaft. In addition, the spacing defined between the flange disposed near one end of the dowel hole and the opening of the gear shaft is used to introduce the lubricating oil splashed by a gear (e.g., a counter first-speed gear) closest to the flange into the gear shaft and a bearing for the gear shaft. In other words, the cavities, serving as the dowel holes, function as a manifold through which the lubricating oil flows. Additionally, the dowel member is fitted in the above-described enlarged-diameter parts extending in opposite directions from the joint of the first and second tubular portions, and functions as a seal for appropriately preventing leakage of the lubricating oil. Furthermore, the flange functions as a guide plate for collecting part of the splashed lubricating oil and guiding the collected lubricating oil to the inside of the gear shaft and the bearing.

In this system, the flange may be disposed adjacent to an outer circumferential surface of a gear closest to the flange and may have an inclined side surface.

In this configuration, the flange is disposed so as to readily introduce the splashed lubricating oil to the gear shaft. The splashed lubricating oil can be appropriately collected by the inclined side surface of the flange.

In the system, the end of the first tubular portion adjacent to the gear shaft may have an orifice structure.

This allows the lubricating oil ejected from an end surface of the first tubular portion to be increased in velocity, thus increasing a range reached by the lubricating oil. Consequently, the lubricating oil can reach the back of the inside of the gear shaft. Advantageously, if the end surface of the first tubular portion is remote from the opening of the gear shaft, the lubricating oil can reach the inside of the gear shaft.

The transmission lubrication system according to the present application requires no additional pipe member for introducing lubricating oil into the gear shaft whose opening at its end is remote from a lubricating oil ejection port and accordingly requires no attachment of such a pipe member to a transmission case, and enables appropriate lubrication of the inside of the gear shaft and the bearing during transition from a low speed mode to a high speed mode. Specifically, the dowel hole of the housing and the dowel hole of the cover are aligned with the gear shaft. The cavities, serving as the dowel holes, are used as the manifold for the lubricating oil. The first and second tubular portions (dowel holes) have the enlarged-diameter parts extending in opposite directions from the joint of the first and second tubular portions. The dowel member (hollow cylindrical member) is tightly fitted in the enlarged-diameter parts each extending in a predetermined range. When the lubricating oil passes through the first and second tubular portions, the dynamic pressure of the lubricating oil is increased and the lubricating oil is forcefully discharged (ejected) from the end of the first tubular portion, so that the lubricating oil is supplied to the lubricating oil supply passage of the gear shaft. In particular, the orifice structure, serving as a lubricating oil ejection port, in the end of the first tubular portion allows the dynamic pressure of the lubricating oil to be further increased and also allows the lubricating oil to be more forcefully discharged (ejected). Consequently, more lubricating oil can be supplied to the lubricating oil supply passage of the gear shaft.

In addition, since the first tubular portion includes the flange at its end adjacent to the gear shaft and the flange has the inclined side surface, part of the lubricating oil splashed and scattered by the gear closest to the flange is appropriately collected by the side surface of the flange at the end of the first tubular portion. The collected lubricating oil is guided by a bottom surface of the flange and is supplied to a side surface of the bearing through the spacing.

The transmission lubrication system according to the present application requires no additional pipe member, which has been required in a lubrication system known in the art, no additional members for attaching such a pipe member to the housing, and no additional processing for attachment, thus resulting in a reduction in cost of parts and processing.

Since the first tubular portion (housing) is securely connected to the second tubular portion (cover) by the dowel member, part of the housing in the vicinity of the gear shaft is accordingly supported by the cover, thus appropriately increasing the rigidity of the housing. Additionally, since the dowel member is tightly fitted in the first enlarged-diameter part (housing) and the second enlarged-diameter part (cover), the dowel member also functions as a seal.

Obviously, numerous modifications and variations of the present invention are possible in light of the above teachings. It is therefore to be understood that within the scope of the appended claims, the invention may be practiced otherwise than as specifically described herein.

What is claimed is:

1. A lubrication system for a transmission including a gear shaft having therein a lubricating oil supply passage that extends axially and has at least one open end, a housing rotatably supporting the gear shaft, and a cover fastened to the housing by a fastener, the cover having therein a lubricating oil passage, the system comprising:
- a first tubular portion facing an opening of the gear shaft, protruding from an outer surface of the housing, and having a cavity;
- a second tubular portion joined to the first tubular portion, the second tubular portion protruding from an inner surface of the cover and having a cavity; and
- a hollow cylindrical member disposed in the first and second tubular portions,
- the first tubular portion having a first enlarged-diameter part axially extending from a joint at which the first tubular portion is joined to the second tubular portion,
- the second tubular portion having a second enlarged-diameter part that axially extends from the joint and has a diameter identical to that of the first enlarged-diameter part,
- the first tubular portion including a flange at one end adjacent to the gear shaft,
- the hollow cylindrical member being fitted in the first and second enlarged-diameter parts of the first and second tubular portions joined to each other,
- the flange and the opening of the gear shaft defining spacing therebetween.

2. The system according to claim 1,
- wherein the flange has a first surface that extends substantially perpendicular to an axis of the lubricating oil supply passage,
- wherein the flange has a side surface that is disposed adjacent to an outer circumferential surface of a gear closest to the flange, and
- wherein the side surface of the flange is inclined with respect to the first surface.

3. The system according to claim 1, wherein the end of the first tubular portion adjacent to the gear shaft has an orifice structure.

4. The system according to claim 1, wherein the hollow cylindrical member is fitted in the first and second enlarged-diameter parts to form a seal for preventing leakage of lubricating oil from the joint at which the first tubular portion is joined to the second tubular portion.

5. A lubrication system for a transmission, comprising:
- a first tubular portion having a cavity and including a flange at one end adjacent to a gear shaft of the transmission, the gear shaft having an opening and extending in an axial direction of the gear shaft, the first tubular portion facing the opening of the gear shaft and protruding in the axial direction from an outer surface of a housing of the transmission, the housing rotatably supporting the gear shaft, the flange and the opening defining a space between the flange and the opening;
- a second tubular portion having a cavity, joined to the first tubular portion, and protruding in the axial direction from an inner surface of a cover of the transmission, the cover being fastened to the housing with a fastener, the first tubular portion having a first enlarged-diameter part extending in the axial direction from a joint at which the first tubular portion is joined to the second tubular portion, the second tubular portion having a second enlarged-diameter part that extends in the axial direction from the joint and has a diameter substantially equal to a diameter of the first enlarged-diameter part; and
- a hollow cylindrical member disposed in the first and second tubular portions and fitted in the first and second enlarged-diameter parts of the first and second tubular portions joined to each other.

6. The system according to claim 5,
- wherein the flange has a first surface that extends substantially perpendicular to an axis of the lubricating oil supply passage,
- wherein the flange has a side surface that is disposed adjacent to an outer circumferential surface of a gear closest to the flange, and
- wherein the side surface of the flange is inclined with respect to the first surface.

7. The system according to claim 5,
- wherein the one end of the first tubular portion adjacent to the gear shaft has an orifice structure.

8. The system according to claim 5,
- wherein the one end of the first tubular portion adjacent to the gear shaft has a hole which passes through the one end in the axial direction, and
- wherein a diameter of the hole is smaller than a diameter of the first tubular portion.

9. The system according to claim 5,
- wherein the first tubular portion and the second tubular portion are coaxially arranged.

10. The system according to claim 5, wherein the hollow cylindrical member is fitted in the first and second enlarged-diameter parts to form a seal for preventing leakage of lubricating oil from the joint at which the first tubular portion is joined to the second tubular portion.

* * * * *